Aug. 5, 1952          O. GREBE          2,605,613
              ELECTROHYDRAULIC MOVING DEVICE
Filed Jan. 23, 1951                    2 SHEETS—SHEET 1

INVENTOR.
Otto Grebe
BY

Aug. 5, 1952          O. GREBE          2,605,613

ELECTROHYDRAULIC MOVING DEVICE

Filed Jan. 23, 1951          2 SHEETS—SHEET 2

INVENTOR.
Otto Grebe
BY
Michael S[illegible]

Patented Aug. 5, 1952

2,605,613

UNITED STATES PATENT OFFICE 2,605,613

ELECTROHYDRAULIC MOVING DEVICE

Otto Grebe, Olpe, Germany, assignor to Elektro-Mechanik G. m. b. H., Wendenerhutte Uber Olpe, Germany Application January 23, 1951, Serial No. 207,311
In Germany January 30, 1950

20 Claims. (Cl. 60—52)

The present invention relates to an electrohydraulic moving device, and more particularly to an electrohydraulic moving device comprising electrically operated driving means, a pump driven by the same and displacing a pressure fluid such as oil, and a piston operatively connected to the pump so as to be actuated by the pressure fluid displaced by the pump.

It is an object of the present invention to render the pressure and/or the quantity of the fluid displaced by the pump easily controllable.

It is another object of the present invention to keep the cylinder clearance of the pump as small as possible.

It is a further object of the present invention to simplify the design of the pump and to render the space required for the same as small as possible.

It is still another object of the present invention to reduce the oscillating masses of the member controlling the pump.

It is a still further object of the present invention to shield the piston and the part to be adjusted by the same against vibrations of the pump aggregate.

An electrohydraulic adjusting device according to the invention comprises in its broadest aspect a piston adapted to be connected to a part to be moved by the device, a pump operatively connected to the piston so as to displace the same by a pressure fluid displaced by the pump, a first electromagnet driving the pump, a first winding forming part of the first electromagnet and energized by an alternating current, a control member inserted between the pump and the piston so as to control the flow of pressure fluid from the pump to the piston, a second electromagnet driving the control member, and a second winding forming part of the second electromagnet and energized by an alternating current having the same frequency as the alternating current energizing the first winding.

Preferably the current energizing the second winding has a phase lag amounting to 45° compared to the current energizing the first winding.

In a preferred embodiment means are provided for shifting the phase of the alternating current energizing the second winding against the phase of the alternating current energizing the first winding whereby the pressure and quantity of the fluid displaced by the pump can be adjusted.

Preferably means are provided for inverting the phase of one of the currents energizing the windings in order to reverse the directions of the displacements of the pressure fluid.

In a preferred embodiment of the present invention the pumping system is tuned to the frequency of the alternating current energizing the first winding.

According to a preferred embodiment of the present invention the control member is tuned to resonance with the frequency of the alternating currents energizing the windings so that the control slots of the control member can be extended.

Preferably the pump includes a piston and the control member is arranged at right angles thereto in order to keep as small as possible the cylinder clearance of the pump.

According to a preferred embodiment of the present invention the control member is made hollow and resilient means are arranged within the hollow control member and render the same part of an oscillating system having a predetermined natural frequency. Thereby it is achieved that the design of the pump is simplified and the latter occupies very little space; at the same time the oscillating mass of the control member is reduced.

In a preferred embodiment of the present invention the first electromagnet driving the pump has a magnetic core carrying the first winding, the core and the first winding being so dimensioned that the core is saturated if a current at the rating voltage flows in the first winding. Preferably the second electromagnet driving the control member has a magnetic core carrying the second winding, the core and the second winding being so dimensioned that the core is saturated if an alternating current at the rating voltage flows in the second winding.

A preferred embodiment of the present invention comprises in combination, a tank containing a pressure fluid, a pump arranged within the tank and having a piston, a first electromagnet arranged in the tank and driving the pump, a first winding forming part of the first electromagnet and energized by an alternating current, a control member arranged in the tank, a cylinder arranged in the tank, a piston arranged in the cylinder and adapted to be connected to a part to be moved by the device, the control member being inserted between the pump and the cylinder so as to control the flow of pressure fluid from the pump to the cylinder, a second electromagnet driving the control member, a second winding forming part of the second electromagnet and energized by an alternating current having the same frequency as the alternating current energizing the first winding, and means for securing the pump and the electromagnets to the tank, the securing means damping any vibrations produced by the pump and being independent of the cylinder and the piston arranged in the cylinder.

Preferably a resilient hose connecting the pump and the cylinder serves as a chamber equalizing the oscillations of pressure of the fluid.

Preferably the tank has a lid to which the pump and the electromagnets are secured by means including vibration-damping elements.

Preferably a resilient, e. g. corrugated tube connects the pump and the cylinder and serves as a vibration-attenuating part of the securing means.

In another embodiment of the present invention the cylinder is arranged above the lid of the tank and two corrugated tubes connected to the cylinder serve for suspending the pump and the electromagnets from the lid of the tank. Preferably the piston adapted for connection with the part to be moved is designed as a rotary piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
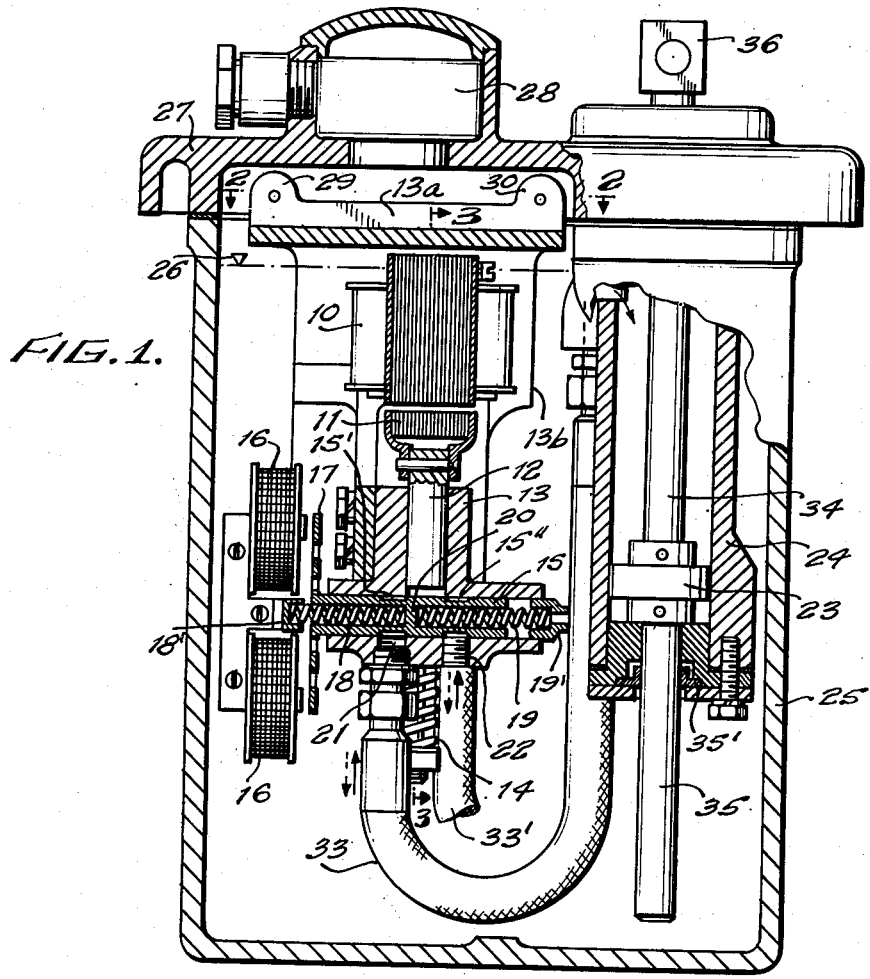
Fig. 1 is a side elevation, partly in section, of a first embodiment of the present invention.
Figure 2:
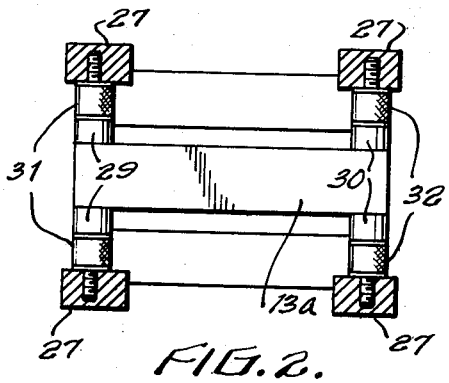
Fig. 2 is a plan view of a part of Fig. 1 seen in the direction 2—2.
Figure 3:
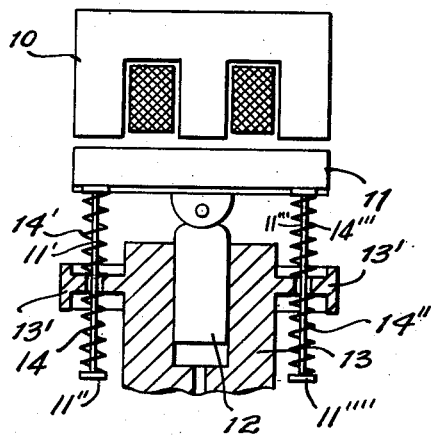
Fig. 3 is a side elevation, partly in section, of the part indicated by the line 3—3 of Fig. 1 and being at right angles to the same.

Referring now to the drawings and first to Figures 1, 2 and 3, a first electromagnet 10 drives a pump the piston 12 of which is connected to the armature 11 of the first electromagnet 10 and moves in a pump cylinder 13. The armature 11 is under the action of a plurality, e. g. four helical compression springs such as 14 which is shown in Fig. 1. The whole aggregate, however, of four springs 14, 14', 14'', 14''' can be seen from Fig. 3, each spring abutting against an extension 13' of the cylinder 13. The springs 14 and 14' surround a rod 11' which is rigid with the armature 11 and ends in a member 11'' abutting against the end of the spring 14 which does not abut against the extension 13'. Similarly the springs 14'' and 14''' surround a rod 11''' which is rigid with the armature 11 and ends in a member 11'''' against which the spring 14'' abuts with one end thereof. In this way it is accomplished that whenever the alternating current supplied to the winding of the first electromagnet 10 passes through zero, the armature 11 is withdrawn from the electromagnet 10 by means of the springs 14, 14', 14'', 14''', the latter being tensioned when the armature 11 is attracted by the electromagnet 10. When the armature 11 is withdrawn from the electromagnet 10 the pump piston 12 ejects the oil which had been sucked in by the same during the attraction of the armature 11 by the driving electromagnet 10.

The pump cylinder 13 is provided with a boring arranged at right angles to the piston 12 and accommodating a control member or slide 15 which is rigidly connected to the armature 17 of a second electromagnet 16, also supplied with an alternating current as explained more in detail hereinafter. The control member 15 is preferably made hollow in order to accommodate springs 18 and 19 rendering the armature 17 and the control member 15 parts of an oscillating system having twice the frequency of the alternating currents energizing the windings of the second electromagnet 16. The springs 18 and 19 are separated from one another by a partition 20 of the control member 15 against which each of the springs 18 and 19 abuts with one end thereof, the opposite ends of the springs 18 and 19 abutting against stationary members 18' and 19', respectively. The partition 20 serves for dampening the oscillations of the control member 15 which, however, can also be dampened by the leaking pressure fluid such as oil.

The control member 15 cooperates by means of control slots 15' and 15'' with openings 21 and 22 in the cylinder 13 to which hoses 33 and 33' are connected, respectively, the arrows shown in full lines in Fig. 1 showing the direction of the oil flow if, for instance, the current in the windings of the electromagnet 16 driving the control member 15 is leading in phase as compared to the current supplied to the driving electromagnet 10, the arrows shown in dotted lines indicating the direction of the oil flow when the energizing current of the control magnet 16 lags behind the current of the driving magnet 10.

Figure 4:
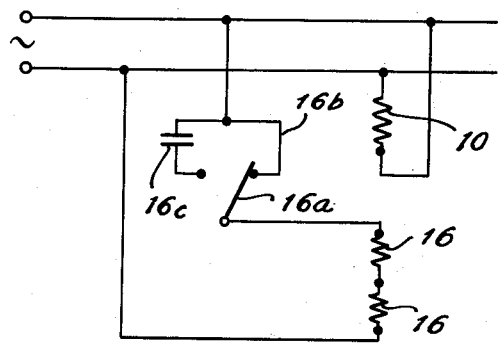
Fig. 4 is a wiring diagram showing the connections of the windings of the electromagnets of the pump system to a single phase alternating current line.
Figure 5:
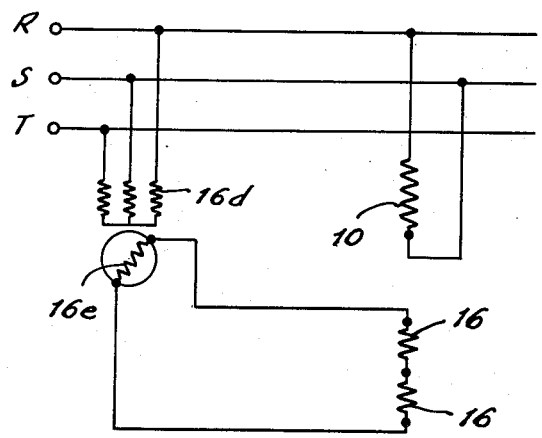
Fig. 5 is a similar wiring diagram showing the connection of the windings to a three-phase line.

Referring now to Figs. 4 and 5, two embodiments of the connection of the windings of the magnets 10 and 16 are shown. In Fig. 4 the windings 10 and 16 are each connected to a single phase alternating current line. The winding 10 is directly connected to the line whereas the winding 16 is connected to the line by means of a double throw switch 16a which connects in one position thereof one end of the winding 16 directly by means of a connection 16b to one terminal of the line whereas in the other position of the switch 16a a condenser 16c is inserted between the one end of the winding 16 and the just mentioned terminal of the line. It will be understood that in one position of the switch 16a the current in the winding 16 lags, and in the other position of the switch 16a leads, in phase with respect to the current in the winding 10.

In Fig. 5 the winding 10 is directly connected to two phases R and S of the three-phase line RST. The winding 16 is connected to the secondary 16e of a rotary transformer the star-connected three-phase primary 16d of which is connected to the phases RST. By adjusting the secondary 16e of the rotary transformer any phase relation between the currents flowing in the windings 10 and 16 is obtained.

Assuming now that the current in the control magnet 16 lags behind the current in the driving magnet 10, the operation of the device so far described is as follows:

In the position shown in Fig. 1, the control member 15 is in the middle or zero position and the pump piston 12 is in its lowermost position. When the piston 12 moves upward owing to an attraction of the armature 11 by the electromagnet 10, the control member 15 will be further removed from the electromagnet 16 and moves toward the right-hand side in Fig. 1. In consequence thereof, a connection is established between the pump cylinder 13 and the opening 21 by the control slot 15' and oil is sucked through the hose 33 into the pump. A half cycle later, when the pump piston 12 moves downward, the control member moves toward the lefthand side because the armature 17 is attracted by the electromagnet 16. In consequence thereof a connection is established by the control slot 15'' with the opening 22 and the oil is pressed out of the pump through the holes 33'.

If the control magnet 16 is supplied with an alternating current the phase position of which can be arbitrarily adjusted for instance by connecting the winding 16 to the secondary 16e of a rotary transformer (Fig. 5) the following effects are obtained:

(1) If the alternating current in the electromagnet 16 is in phase with the alternating current in the driving magnet 10, the piston 12 and the control member 15 carry out motions which are equally in phase with each other so that the quantity of fluid displaced by the pump is nil.

(2) If the alternating current in the control magnet 16 leads before the alternating current in the driving magnet 10, the quantity of displaced fluid increases with increasing phase angle and reaches a maximum value at an electrical phase lead of 45° since now the control member 15 and the pump piston 12 carry out oscillations which are out of phase by 90°. It should be noted that owing to the quadratic relation between the currents and the pulling force the frequency is doubled so that a phase difference of 45° of the currents in the magnet windings is sufficient for obtaining a mechanical phase difference of 90° between the amplitudes of the pump piston 12 and the control member 15.

(3) If the alternating current in the control magnet 16 lags behind the alternating current of the driving magnet 10, the pump piston 12 will displace the fluid such as oil, however, in opposite direction to that in the case (2). If the electrical phase difference is brought to 90° as compared to the maximum output of case (2), i. e. to 45°, the pump displaces the oil with the maximum power in a direction opposite to that in which the oil is displaced in case (2).

In order to render the operation of the pump independent of variations of voltage it is advisable to design the core and the winding of the driving electromagnet so that the core is saturated at the rating voltage. In consequence thereof the magnetizing current changes according to the variations of voltage, but the flux generated by the magnetizing current in the air gap will be practically invariable within the range of voltage variations amounting to ±10%. It is equally advisable to design the core and the windings of the control magnet 16 so that the control magnet operates within the range of saturation so that the flux through the air gap and the magnetic force generating the same do not practically vary within variations of the voltage amounting to ±10%.

Referring now to Figs. 1 and 2, the piston 23 adapted to be connected to the part to be moved by the device is reciprocating within a pressure cylinder 24 which is arranged within an oil tank 25 enclosing also the magnetically driven pump system. The tank 25 is filled to the level 26 with pressure fluid such as oil. A lid 27 closes the tank 25 at the upper side thereof and carries a terminal box 28 for the electrical connections to the windings of the magnets 10 and 16. The pump aggregate consisting of the driving magnet 10, the armature 11 thereof, the pump piston 12, the pump cylinder 13, the springs 14, the control member 15, the control magnet 16, and the armature 17 thereof is suspended from the lid 27 by means of eyelets 29, 30 and rubber metal blocks 31, 32 which prevent the transfer of the oscillations of the pump to the lid 27. The pump cylinder 13 is provided in the upper part thereof with a bridge member 13a which is connected by means of ribs 13b to the main portion of the cylinder 13. The eyelets 29, 30 are integral with the bridge member 13a. In order to prevent the transfer of vibrations to the pressure cylinder 24 by the connection thereof with the pump system, the latter is formed by resilient hoses 33, 33' which serve as vibration-attenuating parts.

The pressure cylinder 24 is arranged with the axis thereof parallel to the axis of the pump piston 12 and is suspended from the lid 27. The suspension, however, need not be provided with vibration-attenuating means since the vibrations of the pump are sufficiently intercepted by the rubber metal blocks 31, 32 and the hoses 33, 33'. The piston 23 is rigidly connected to piston rods 34, 35 protruding above and below, respectively, the cylinder 24 through gaskets such as 35. The piston rod 34 carries at the upper end thereof an eye 36 serving for coupling the device to the part to be moved (not shown).

The operation of this device is as follows:

When the electromagnets are energized as described more in detail hereinabove, the pump supplies oil in a controllable quantity, as described hereinabove more in detail, to the hoses 33, 33' and to the pressure cylinder 24 so that the piston 23 is reciprocated and moves the part (not shown) connected to the eye 36.

By lifting the lid 27 all essential elements of the device are rendered easily accessible and can be repaired in case of damage.

Figure 6:
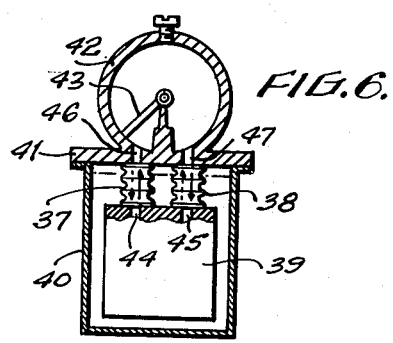
Fig. 6 is a sectional elevation of a second embodiment of the present invention.

Referring now to Fig. 6, the pump aggregate (not shown) is enclosed in a container 39 which is connected by means of corrugated connecting members 37, 38 to the pressure cylinder 42 containing a rotary piston 43. The pressure cylinder 42 is arranged above the lid 41 of the oil tank 40 and the corrugated tubes 37, 38 serve at the same time for suspending the container 39 and the pump aggregate arranged therein from the lid 41. The tubes 37, 38 are connected by openings 44, 45 to the pump aggregate within the container 39 and through openings 46, 47 to the pressure cylinder 42.

The operation of this device is substantially the same as that of the device shown in Figs. 1 to 3 except that the piston 43 is designed as a rotary piston which allows considerably to reduce the overall height of the device and to drive rotary devices such as flaps.

It will be understood that each of the elements described above, or two or more together, may also find a useful application in other types of electrohydraulic moving devices differing from the types described above.

While I have illustrated and described the invention as embodied in an electrohydraulic moving device having an electrically operated pump, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member inserted between said pump and said piston so as to control the flow of pressure fluid from said pump to said piston; a second electromagnet driving said control member; and a second winding forming part of said second electromagnet and energized by an alternating current having the same frequency as the alternating current energizing said first winding.

2. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member inserted between said pump and said piston so as to control the flow of pressure fluid from said pump to said piston; a second electromagnet driving said control member; and a second winding forming part of said second electromagnet and energized by an alternating current having the same frequency as the alternating current energizing said first winding, the current energizing said second winding having a phase lag amounting to 45° as compared to the current energizing said first winding.

3. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member inserted between said pump and said piston so as to control the flow of pressure fluid from said pump to said piston; a second electromagnet driving said control member; a second winding forming part of said second electromagnet and energized by an alternating current having the same ferquency as the alternating current energizing said first winding; and means for shifting the phase of the alternating current energizing said second winding against the phase of the alternating current energizing said first winding whereby the pressure and quantity of the fluid displaced by the pump can be adjusted.

4. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member inserted between said pump and said piston so as to control the flow of pressure fluid from said pump to said piston; a second electromagnet driving said control member; a second winding forming part of said second electromagnet and energized by an alternating current having the same frequency as the alternating current energizing said first winding; and means for inverting the phase of one of the currents energizing said windings in order to reverse the direction of the displacements of the pressure fluid.

5. An electrohydraulic moving device comprising in combination, a piston adapted to be connected to a part to be moved by the device; a pumping system operatively connected to said piston so as to displace the same by a pressure fluid displaced by said pumping system; a first electromagnet driving said pumping system; a first winding forming part of said electromagnet and energized by an alternating current having a predetermined frequency, said pumping system being tuned to the frequency of the alternating current energizing said first winding; a control member inserted between said pumping system and said piston so as to control the flow of pressure fluid from said pumping system to said piston; a second electromagnet driving said control member; and a second winding forming part of said second electromagnet and energized by an alternating current having the same frequency as the alternating current energizing said first winding.

6. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member having control slots and being inserted between said pump and said piston so as to control the flow of pressure fluid from said pump to said piston; a second electromagnet driving said control member; and a second winding forming part of said second electromagnet and energized by an alternating current having the same frequency as the alternating current energizing said first winding, said control member being tuned to resonance with the frequency of the alternating currents energizing said windings so that said control slots can be extended.

7. An electrohydraulic moving device comprising in combination, a first piston adapted to be connected to a part to be moved by the device; a pump operatively connected to said first piston; a second piston forming part of said pump and displacing a pressure fluid acting on said first piston; a first electromagnet driving said pump; a first winding forming part of said first electromagnet and energized by an alternating current; a control member arranged at right angles to said second piston and inserted between said pump and said piston so as to control the flow of pressure fluid from said pump to said piston; a second electromagnet driving said control member; and a second winding forming part of said second electromagnet and energized by an alternating current having the same frequency as the alternating current energizing said first winding.

8. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a hollow control member inserted between said pump and said piston so as to control the flow of pressure fluid from said pump to said piston; a second electromagnet driving said control member; a second winding forming part of said second electromagnet and energized by an alternating current having the same frequency as the alternating current energizing said first winding; and resilient means arranged within said hollow control member and rendering the same part of an oscillating system having a predetermined natural frequency.

9. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a hollow control member inserted between said pump and said piston so as to control the flow of pressure fluid from said pump to said piston; a second electromagnet driving said control member; a second winding forming part of said second electromagnet and energized by an alternating current having the same frequency as the alternating current energizing said first winding; and resilient means arranged within said hollow control member and rendering the same part of an oscillating system having a predetermined natural frequency being in resonance with the frequency of the alternating currents energizing said windings.

10. An electrohydraulic moving device comprising in combination, a piston adapted to be connected to a part to be moved by the device; a pump operatively connected to said piston so as to displace the same by a pressure fluid displaced by said pump; a first electromagnet driving said pump and having a first magnetic core and a first winding arranged on said first core, said first winding being energized by an alternating current at a rating voltage, said first core and said first winding being so dimensioned that said first core is saturated if a current at the rating voltage flows in said first winding; a control member inserted between said pump and said piston so as to control the flow of pressure fluid from said pump to said piston; a second electromagnet driving said control member; and a second winding forming part of said second electromagnet and energized by an alternating current having the same frequency as the alternating current energizing said first winding.

11. An electrohydraulic moving device comprising in combination, a piston adapted to be connected to a part to be moved by the device; a pump operatively connected to said piston so as to displace the same by a pressure fluid displaced by said pump; a first electromagnet driving said pump; a first winding forming part of said first electromagnet and energized by an alternating current; a control member inserted between said pump and said piston so as to control the flow of pressure fluid from said pump to said piston; a second electromagnet driving said control member and having a magnetic core and a second winding arranged on said core, said second winding being energized by an alternating current at a rating voltage having the same frequency as the alternating current energizing said first winding, said core and said second winding being so dimensioned that said core is saturated if an alternating current at the rating voltage flows in said second winding.

12. An electrohydraulic moving device comprising in combination, a piston adapted to be connected to a part to be moved by the device; a pump operatively connected to said piston so as to displace the same by a pressure fluid displaced by said pump; a first electromagnet driving said pump and having a first magnetic core and a first winding arranged on said first core, said first winding being energized by an alternating current at a rating voltage, said first core and said first winding being so dimensioned that said first core is saturated if a current at the rating voltage flows in said first winding; a control member inserted between said pump and said piston so as to control the flow of pressure fluid from said pump to said piston; a second electromagnet driving said control member and having a second magnetic core and a second winding arranged on said second core, said second winding being energized by an alternating current at a rating voltage having the same frequency as the alternating current energizing said first winding, said second core and said second winding being so dimensioned that said second core is saturated if an alternating current at the rating voltage flows in said second winding.

13. An electrohydraulic moving device comprising in combination, a tank containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged in said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; and means for securing said pump and said electromagnets to said tank, said securing means damping any vibrations produced by said pump and being independent of said cylinder and said piston arranged in said cylinder.

14. An electrohydraulic moving device comprising in combination, a tank containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged in said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; means for securing said pump and said electromagnets to said tank, said securing means damping any vibrations produced by said pump and being independent of said cylinder and said piston arranged in said cylinder; and a resilient hose connecting said pump and said cylinder and serving as a chamber equalizing the oscillations of pressure of the fluid.

15. An electrohydraulic moving device comprising in combination, a tank having a lid and containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged in said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; and means for securing said pump and said electromagnets to said lid of said tank, said securing means including elements damping any vibrations produced by said pump and being independent of said cylinder and said piston arranged in said cylinder.

16. An electrohydraulic moving device comprising in combination, a tank having a lid and containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged in said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; means for securing said pump and said electromagnets to said lid of said tank, said securing means including elements damping any vibrations produced by said pump and being independent of said cylinder and said piston arranged in said cylinder; and a resilient tube connecting said pump and said cylinder and serving as a vibration-attenuating part of said securing means.

17. An electrohydraulic moving device comprising in combination, a tank having a lid and containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged in said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; means for securing said pump and said electromagnets to said lid of said tank, said securing means including elements damping any vibrations produced by said pump and being independent of said cylinder and said piston arranged in said cylinder; and a resilient corrugated tube connecting said pump and said cylinder and serving as a vibration-attenuating part of said securing means.

18. An electrohydraulic moving device comprising in combination, a tank having a lid and containing a pressure fluid; a pump arranged within said tank and having a piston; a first electromagnet arranged in said tank and driving said pump; a first winding forming part of said first electromagnet and energized by an alternating current; a control member arranged in said tank; a cylinder arranged above the lid of said tank; a piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current the same frequency as the alternating current energizing said first winding; and two corrugated tubes for suspending said pump and said electromagnets from said lid of said tank.

19. An electrohydraulic moving device comprising in combination, a tank having a lid and containing a pressure fluid; a pump arranged within said tank and having a piston; a first electromagnet arranged in said tank and drivng said pump; a first winding forming part of said first electromagnet and energized by an alternating current; a control member arranged in said tank; a cylinder arranged above the lid of said tank; a rotary piston arranged in said cylinder and adapted to be connected to a part to be moved by the device, said control member being inserted between said pump and said cylinder so as to control the flow of pressure fluid from said pump to said cylinder; a second electromagnet driving said control member; a second winding forming part of said second electromagnet and energized by an alternating current having the same frequency as the alternating current energizing said first winding; and two corrugated tubes for suspending said pump and said electromagnets from said lid of said tank.

20. An electrohydraulic moving device comprising in combination, a piston adapted to be connected to a part to be moved by the device; a pumping system operatively connected to said piston so as to displace the same by a pressure fluid displaced by said pumping system; a first electromagnet driving said pumping system; a first winding forming part of said electromagnet and energized by an alternating current having a predetermined frequency; resilient means forming part of said pumping system and permitting the same to be tuned to the frequency of the alternating current energizing said first winding; a control member inserted between said pumping system and said piston so as to control the flow of pressure fluid from said pumping system to said piston; a second electromagnet driving said control member; and a second winding forming part of said second electromagnet and energized by an alternating current having the same frequency as the alternating current energizing said first winding.

OTTO GREBE.

No references cited.